(12) United States Patent
Zeng et al.

(10) Patent No.: US 9,897,739 B2
(45) Date of Patent: Feb. 20, 2018

(54) OPTICAL FILM, BACKLIGHT MODULE, AND DISPLAY DEVICE

(71) Applicants: SHENZHEN CHINA STAR OPTOELECTRONICS TECHNOLOGY CO., LTD., Shenzhen, Guangdong (CN); WUHAN CHINA STAR OPTOELECTRONICS TECHNOLOGY CO., LTD, Wuhan, Hubei (CN)

(72) Inventors: Jie Zeng, Guangdong (CN); Gege Zhou, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 270 days.

(21) Appl. No.: 14/438,630

(22) PCT Filed: Apr. 9, 2015

(86) PCT No.: PCT/CN2015/076178
§ 371 (c)(1),
(2) Date: Apr. 26, 2015

(87) PCT Pub. No.: WO2016/149965
PCT Pub. Date: Sep. 29, 2016

(65) Prior Publication Data
US 2017/0139098 A1    May 18, 2017

(30) Foreign Application Priority Data
Mar. 20, 2015 (CN) .......................... 2015 1 0124667

(51) Int. Cl.
*F21V 7/04* (2006.01)
*F21V 8/00* (2006.01)

(52) U.S. Cl.
CPC ........... *G02B 6/005* (2013.01); *G02B 6/0055* (2013.01); *G02B 6/0088* (2013.01)

(58) Field of Classification Search
CPC . G02B 5/305; G02B 6/0021; G02F 1/133308; G02F 1/133602; G02F 1/133604; G02F 2001/133325
(Continued)

(56) References Cited

U.S. PATENT DOCUMENTS

2006/0250539 A1\* 11/2006 Yu ..................... G02F 1/133502
349/58
2006/0262555 A1\* 11/2006 Yi ..................... G02F 1/133606
362/561
(Continued)

*Primary Examiner* — Thien M Le
(74) *Attorney, Agent, or Firm* — Andrew C. Cheng

(57) ABSTRACT

Provided are an optical film and a backlight module. The backlight module includes a backboard, a light guide plate and the optical film. The backboard includes a bottom plate and two side plates mounted to the bottom plate having outside surfaces. The optical film includes a first film layer and a second film layer stacked on the first film layer. The first film layer has two opposite lateral edges including positioning tabs extending therefrom in a direction away from the first film layer. The light guide plate and the optical film are mounted on the backboard. The optical film is positioned on the light guide plate with the second film layer engaging the light guide plate. The positioning tabs cover surfaces of the side plates distant from the bottom plate and is folded to attach to the outside surfaces of the side plates. A display device is also provided.

10 Claims, 3 Drawing Sheets

(58) Field of Classification Search
USPC .......................................................... 362/607
See application file for complete search history.

(56) References Cited

U.S. PATENT DOCUMENTS

| | | | | |
|---|---|---|---|---|
| 2009/0296023 | A1* | 12/2009 | Lee ...................... | G02B 5/0242 |
| | | | | 349/64 |
| 2010/0061084 | A1* | 3/2010 | Lee ................... | G02F 1/133608 |
| | | | | 362/97.2 |
| 2014/0071370 | A1* | 3/2014 | Wang ................... | G02B 6/0088 |
| | | | | 349/58 |
| 2014/0085576 | A1* | 3/2014 | Benson ................ | G02B 6/0021 |
| | | | | 349/106 |
| 2014/0092342 | A1* | 4/2014 | Franklin .............. | G02B 6/0088 |
| | | | | 349/62 |
| 2014/0098035 | A1* | 4/2014 | Huang ................... | G06F 3/041 |
| | | | | 345/173 |

* cited by examiner

OPTICAL FILM, BACKLIGHT MODULE, AND DISPLAY DEVICE

CROSS REFERENCE TO RELATED APPLICATIONS

This application claims the priority of Chinese Patent Application No. 201510124667.7, entitled "Optical Film, Backlight Module, and Display Device", filed on Mar. 20, 2015, the disclosure of which is incorporated herein by reference in its entirety.

BACKGROUND OF THE INVENTION

1. Field of the Invention

The present invention relates to the field of liquid crystal display technology, and in particular to an optical film, a backlight module, and a display device.

2. The Related Arts

Nowadays, liquid crystal displays, which serve as a displaying component of electronic devices, have been widely used in all sorts of electronic products. To comply with the trend of electronic products getting light and thin, bezels of electronic devices are designed to be increasingly thinner. On the other hand, backlight modules are an important component of the liquid crystal displays and thus, frames of the backlight modules will also get increasingly narrower.

A conventional backlight module comprises a light guide plate, a mold frame arranged around the light guide plate, a backboard arranged around the mold frame, a light-source flexible circuit board, light-emitting diodes (LEDs), and light-shielding adhesive tape. The light-source flexible circuit board and the LEDs are fixed to the light guide plate and the mold frame by the light-shielding adhesive tape. An optical film is fixed to the mold frame by light-shielding double-sided adhesive tape. The mold frame is coupled to the backboard by a snap-fitting structure or double-sided adhesive tape. A liquid crystal display panel is fixed to a perimeter of a backlight unit by double-sided adhesive tape. Such an arrangement makes it impossible for an outer frame of the backlight module to satisfy the need of being narrowed down.

SUMMARY OF THE INVENTION

An object of the present invention is to provide an optical film, which helps reduce the width of an outer frame of a backlight module.

The present invention also provides a backlight module and a display device.

The present invention provides an optical film for use with a backlight module. The optical film comprises a first film layer and a second film layer stacked on the first film layer. The first film layer comprises two opposite lateral edges. The two opposite lateral edges comprise positioning tabs extending therefrom in a direction away from the first film layer.

In the above-described optical film, the second film layer comprises two opposite lateral edges. The two lateral edges of the second film layer each comprise lugs extending therefrom in a direction away from the second film layer. The lugs are located under the positioning tabs.

In the above-described optical film, the first film layer and the second film layer comprise therebetween a plurality of third film layers.

The present invention provides a backlight module. The backlight module comprises a backboard, a light guide plate, and an optical film. The backboard comprises a bottom plate and two side plates mounted to the bottom plate. The side plates each have an outside surface. The optical film comprises a first film layer and a second film layer stacked on the first film layer. The first film layer comprises two opposite lateral edges. The two opposite lateral edges comprise positioning tabs extending therefrom in a direction away from the first film layer. The light guide plate and the optical film are mounted on the backboard and the optical film is stacked on the light guide plate in such a way that the second film layer engages and contacts the light guide plate and the positioning tabs cover surfaces of the side plates that are distant from the bottom plate and are folded to engage and be attached to and fixed to the outside surfaces of the side plates.

In the above-described backlight module, the second film layer comprises two opposite lateral edges. The two lateral edges of the second film layer each comprise lugs extending therefrom in a direction away from the second film layer. The lugs are located under the positioning tabs.

In the above-described backlight module, the surfaces of the side plates that are distant from the bottom plate comprise retention slots formed therein and the lugs are received and retained in the retention slots.

In the above-described backlight module, the backlight module further comprises a reflector plate. The reflector plate is mounted on the bottom plate. The light guide plate is interposed between the reflector plate and the optical film.

In the above-described backlight module, the positioning tabs are fixed to the outside surfaces of the side plates by double-sided adhesive tape or adhesive.

The present invention provides a display device. The display device comprises a backlight module and a display panel. The display panel is arranged above the backlight module. The display panel and an optical film are fixed to each other with double-sided adhesive tape. The backlight module comprises a backboard, a light guide plate, and the optical film. The backboard comprises a bottom plate and two side plates mounted to the bottom plate. The side plates each have an outside surface. The optical film comprises a first film layer and a second film layer stacked on the first film layer. The first film layer comprises two opposite lateral edges. The two opposite lateral edges comprise positioning tabs extending therefrom in a direction away from the first film layer. The light guide plate and the optical film are mounted on the backboard and the optical film is stacked on the light guide plate in such a way that the second film layer engages and contacts the light guide plate and the positioning tabs cover surfaces of the side plates that are distant from the bottom plate and are folded to engage and be attached to and fixed to the outside surfaces of the side plates.

In the above-described display device, the second film layer comprises two opposite lateral edges. The two lateral edges of the second film layer each comprise lugs extending therefrom in a direction away from the second film layer. The lugs are located under the positioning tabs. The surfaces of the side plates that are distant from the bottom plate comprise retention slots formed therein and the lugs are received and retained in the retention slots.

The backlight module of the present invention helps save the use of a mold frame for the edges of the optical film are provided with the positioning tabs and the positioning tabs are foldable to be attached to the outside surfaces of the side plates of the backboard. The sum of the thicknesses of the side plates and the optical film is generally less than total thickness of a mold frame and the side plates and thus, the overall thickness of an outer frame of the backlight module can be reduced.

BRIEF DESCRIPTION OF THE DRAWINGS

To more clearly explain the technical solutions proposed in embodiments of the present invention or those of the prior art, a brief description of the drawings that are necessary for describing the embodiments of the present invention or those of the prior art is given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to technical solutions of the embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Figure 1:
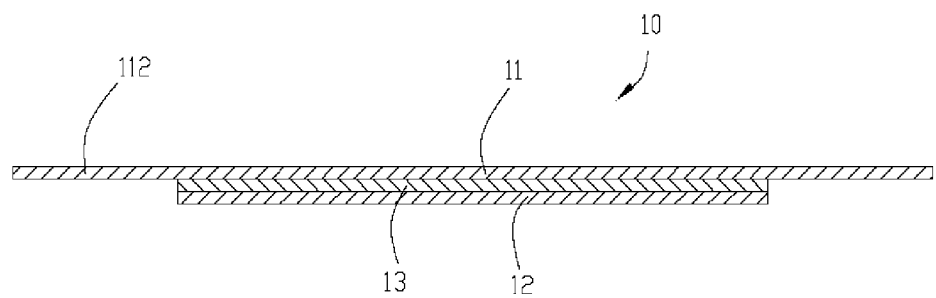
FIG. 1 is a cross-sectional view showing an optical film according to an embodiment of the present invention.

Referring to FIG. 1, an optical film is provided according to an embodiment of the present invention. The optical film 10 comprises a first film layer 11 and a second film layer 13 stacked on the first film layer 11. The first film layer 11 comprises two opposite lateral edges (not labeled) and the two opposite lateral edges each comprise a positioning tab 112 extending therefrom in a direction away from the first film layer 11. In the instant embodiment, the optical film 10 is in the form of a rectangular flat plate. The first film layer 11 and the second film layer 12 are of the same size and the positioning tabs 112 similarly extend beyond the second film layer 12.

Figure 2:
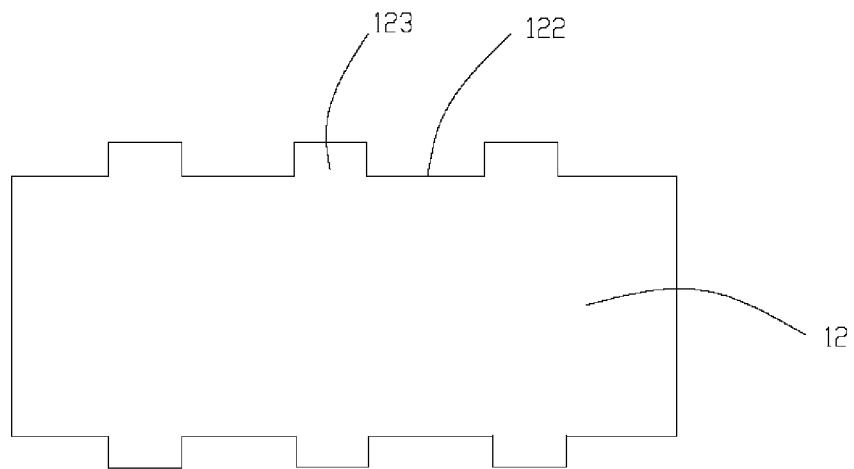
FIG. 2 is a schematic view showing a second film layer of the optical film of FIG. 1.

Referring to FIG. 2, further, the second film layer 12 comprises two opposite lateral edges 122 and the two opposite lateral edges 122 of the second film layer 12 each comprise lugs 123 extending therefrom in a direction away from the second film layer 12. The lugs 123 are located under the positioning tabs 112. The number of the lugs 123 used can be one or multiple. In the instant embodiment, each of the lateral edges 122 comprises a plurality of lugs, which is arranged in a manner of being spaced from each other.

Further, the first film layer 11 and the second film layer 12 also comprise a plurality of third film layer 13 arranged therebetween. In the instant embodiment, the number of the third film layer used is preferably one.

Figure 3:
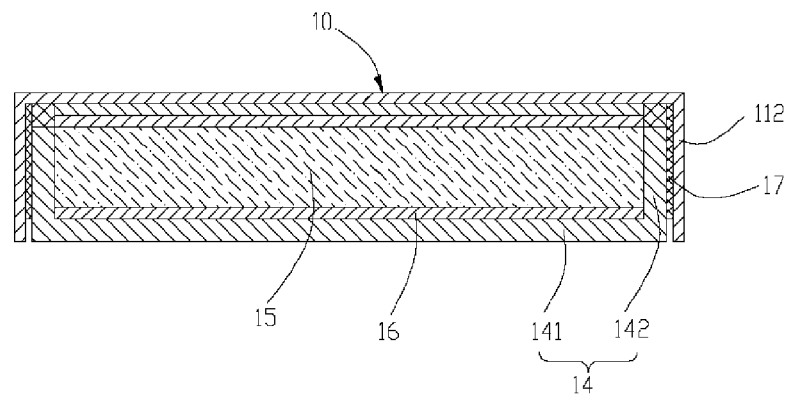
FIG. 3 is a cross-sectional view showing a backlight module comprising the optical film shown in FIG. 1 according to the present invention.

Referring to FIG. 3, the present invention also relates to a backlight module. The backlight module comprises a backboard 14, a light guide plate 15, and the optical film 10. The backboard 14 comprises a bottom plate 141 and two side plates 142. The bottom plate 141 and the side plates 142 collectively delimit and surround a receiving space, which receives the light guide plate 15 and the optical film 10 therein. The two side plates 142 are opposite to each other. The side plates 142 each have an outside surface 143. The light guide plate 15 and the optical film 10 are arranged on the backboard 14 and the optical film 10 is stacked on the light guide plate 15 in such a way that the second film layer 12 engages and contacts the light guide plate 15 and the positioning tabs 112 cover surfaces of the side plates 142 that are distant from the bottom plate 141 and are then folded to engage and be attached and fixed to the outside surfaces of the side plates 142.

Figure 4:
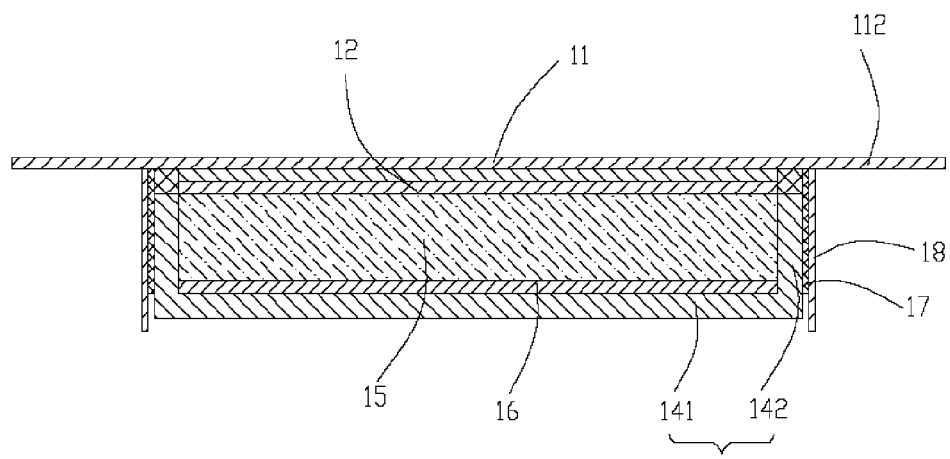
FIG. 4 is a schematic view showing a condition of the backlight module of FIG. 3, where the optical film is not fixed.

Referring to FIG. 4, further, the positioning tabs 112 and the outside surfaces of the side plates 142 are fixed together by double-sided adhesive tape or adhesive. In the instant embodiment, double-sided adhesive tapes 17 are used to fix the positioning tabs 112 and the side plates 142 to each other. Before the optical film 10 is mounted to the backboard 14, the double-sided adhesive tapes 17 may each comprise a protective film 18 at an outer side thereof. When it is desired to secure the optical film 10 to the backboard 14, the light guide plate 15 and the optical film 10 are first positioned on the backboard 14 and the second film layer 12 is attached to the light guide plate 15 with the positioning tabs of the first film layer 11 covering the surfaces of the side plates 142 that are distant from the bottom plate 141 and extending outside the backboard 14. The protective films 18 may then be peeled off and the positioning tabs 112 are folded in a direction toward the side plates 142 of the backboard 14 until the positioning tabs 112 and the outside surfaces of the side plates 142 engage and are securely fixed to each other.

The backlight module of the present invention helps save the use of a mold frame for the edges of the optical film 10 are provided with the positioning tabs 112 and the positioning tabs 112 are foldable to be attached to the outside surfaces of the side plates 142 of the backboard 14. The sum of the thicknesses of the side plates and the optical film is generally less than total thickness of a mold frame and the side plates and thus, the overall thickness of an outer frame of the backlight module can be reduced.

In the instant embodiment, the light guide plate 15 is in the form of a plate. The bottom plate 141 and the side plates 142 define and surround the receiving space, in which the light guide plate 15 and the optical film 10 are received. The light guide plate has non-light-incident sides that are in abutting engagement with the side plates 142.

Figure 5:
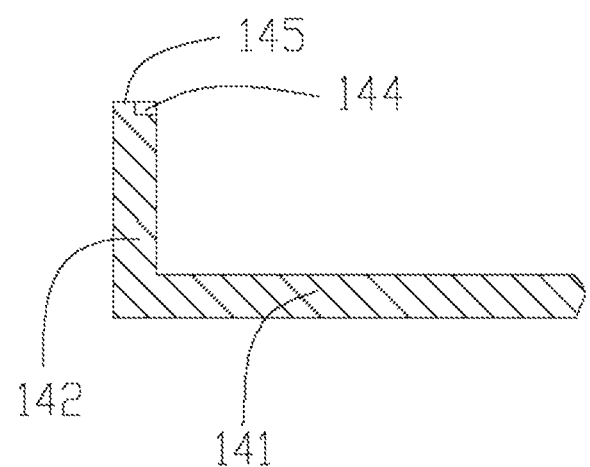
FIG. 5 is a cross-sectional view showing a backboard of the backlight module of FIG. 3.

Referring to FIG. 5, further, the surfaces of the side plates 142 that are distant from the bottom plate 141 are each provided with retention slots 144 formed therein. The second film layer 12 is arranged to locate between the two side plates 142 with the lugs 123 engaging and being retained in the retention slots 144. In the instant embodiment, the surfaces of the side plates 142 that are distant from the bottom plate 141 are upper surfaces 145 and the retention slots 144 is formed in the upper surfaces and also extend through surfaces of the side plates 142 that face toward the optical film 10. The second film layer is positioned on the light guide plate 15 and the lugs 123 are received and retained in the retention slots 144 so that further positioning of the optical film can be achieved to ensure stability of the optical film.

Further, the backlight module further comprises a reflector plate 16. The reflector plate 16 is arranged between the bottom plate 141 and the light guide plate 15.

The present invention also provides a display device. The display device comprises the backlight module and a display panel. The display panel is arranged above the backlight module and the display panel and the optical film are fixed to each other with double-sided adhesive tape.

The above illustrates only a preferred embodiment according to the present invention and is not intended to limit the scope of right of the present invention. Those having ordinary skills of the art would appreciate that various equivalent modifications that achieve all or some of the operations of the above-described embodiment and fall within scope of the attached claims are considered within the scope covered by the present invention.

What is claimed is:

1. An optical film for use with a backlight module that comprises a backboard having a bottom plate and two opposite side plates mounted to the bottom plate, wherein the optical film comprises a first film layer and a second film layer stacked on the first film layer, the first film layer comprising two opposite lateral edges, the two opposite lateral edges comprising positioning tabs extending therefrom in opposite directions away from the first film layer;

wherein the positioning tabs are foldable with respect to the first film layer to be substantially perpendicular to the first film layer such that a first one of the positioning tabs is opposite to a second one of the positioning tabs, the first positioning tab being different from the second positioning tab, the first and second positioning tabs being spaced from each other and adapted to respectively engage the two opposite side plates of the backboard.

2. The optical film as claimed in claim 1, wherein the second film layer comprises two opposite lateral edges, the two lateral edges of the second film layer each comprising lugs extending therefrom in a direction away from the second film layer, the lugs being located under the positioning tabs.

3. The optical film as claimed in claim 2, wherein the first film layer and the second film layer comprise therebetween a plurality of third film layers.

4. A backlight module, comprising a backboard, a light guide plate, and an optical film, wherein the backboard comprises a bottom plate and two side plates mounted to the bottom plate, the side plates each having an outside surface; the optical film comprises a first film layer and a second film layer stacked on the first film layer, the first film layer comprising two opposite lateral edges, the two opposite lateral edges comprising positioning tabs extending therefrom in opposite directions away from the first film layer; and the light guide plate and the optical film are mounted on the backboard and the optical film is stacked on the light guide plate in such a way that the second film layer engages and contacts the light guide plate and the positioning tabs cover surfaces of the side plates that are distant from the bottom plate and are folded to engage and be attached to and fixed to the outside surfaces of the side plates;

wherein the positioning tabs that are attached to and fixed to the outside surfaces of the side plates are substantially perpendicular to the first film layer, wherein a first one of the positioning tabs is opposite to a second one of the positioning tabs, the first positioning tab being different from the second positioning tab, the first and second positioning tabs being spaced from each other and respectively engaging the two opposite side plates of the backboard.

5. The backlight module as claimed in claim 4, wherein the second film layer comprises two opposite lateral edges, the two lateral edges of the second film layer each comprising lugs extending therefrom in a direction away from the second film layer, the lugs being located under the positioning tabs.

6. The backlight module as claimed in claim 5, wherein the surfaces of the side plates that are distant from the bottom plate comprise retention slots formed therein and the second film layer is located between the two side plates with the lugs received and retained in the retention slots.

7. The backlight module as claimed in claim 4, wherein the backlight module further comprises a reflector plate, the reflector plate being mounted on the bottom plate, the light guide plate being interposed between the reflector plate and the optical film.

8. The backlight module as claimed in claim 4, wherein the positioning tabs are fixed to the outside surfaces of the side plates by double-sided adhesive tape or adhesive.

9. A display device, comprising a backlight module and a display panel, the display panel being arranged above the backlight module, the display panel and an optical film being fixed to each other with double-sided adhesive tape, wherein the backlight module comprises a backboard, a light guide plate, and the optical film, the backboard comprising a bottom plate and two side plates mounted to the bottom plate, the side plates each having an outside surface; the optical film comprises a first film layer and a second film layer stacked on the first film layer, the first film layer comprising two opposite lateral edges, the two opposite lateral edges comprising positioning tabs extending therefrom in opposite directions away from the first film layer; and the light guide plate and the optical film are mounted on the backboard and the optical film is stacked on the light guide plate in such a way that the second film layer engages and contacts the light guide plate and the positioning tabs cover surfaces of the side plates that are distant from the bottom plate and are folded to engage and be attached to and fixed to the outside surfaces of the side plates;

wherein the positioning tabs that are attached to and fixed to the outside surfaces of the side plates are substantially perpendicular to the first film layer, wherein a first one of the positioning tabs is opposite to a second one of the positioning tabs, the first positioning tab being different from the second positioning tab, the first and second positioning tabs being spaced from each other and respectively engaging the two opposite side plates of the backboard.

10. The display device as claimed in claim 9, wherein the second film layer comprises two opposite lateral edges, the two lateral edges of the second film layer each comprising lugs extending therefrom in a direction away from the second film layer, the lugs being located under the positioning tabs and wherein the surfaces of the side plates that are distant from the bottom plate comprise retention slots formed therein and the lugs are received and retained in the retention slots.

* * * * *